Dec. 12, 1967   H. HARRISON   3,357,251
ADJUSTABLE DIAL THERMOMETER
Filed July 16, 1965   5 Sheets-Sheet 3

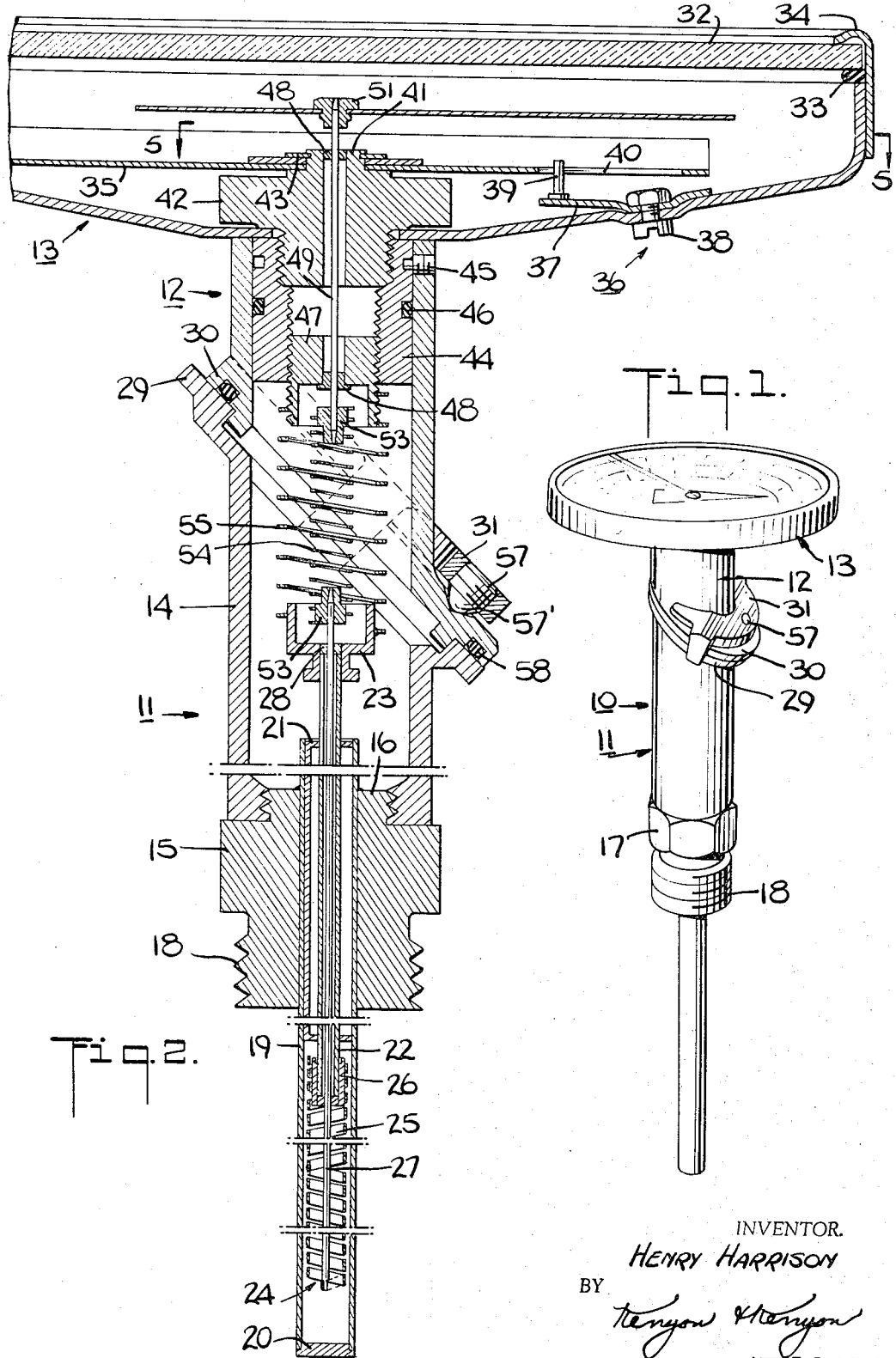

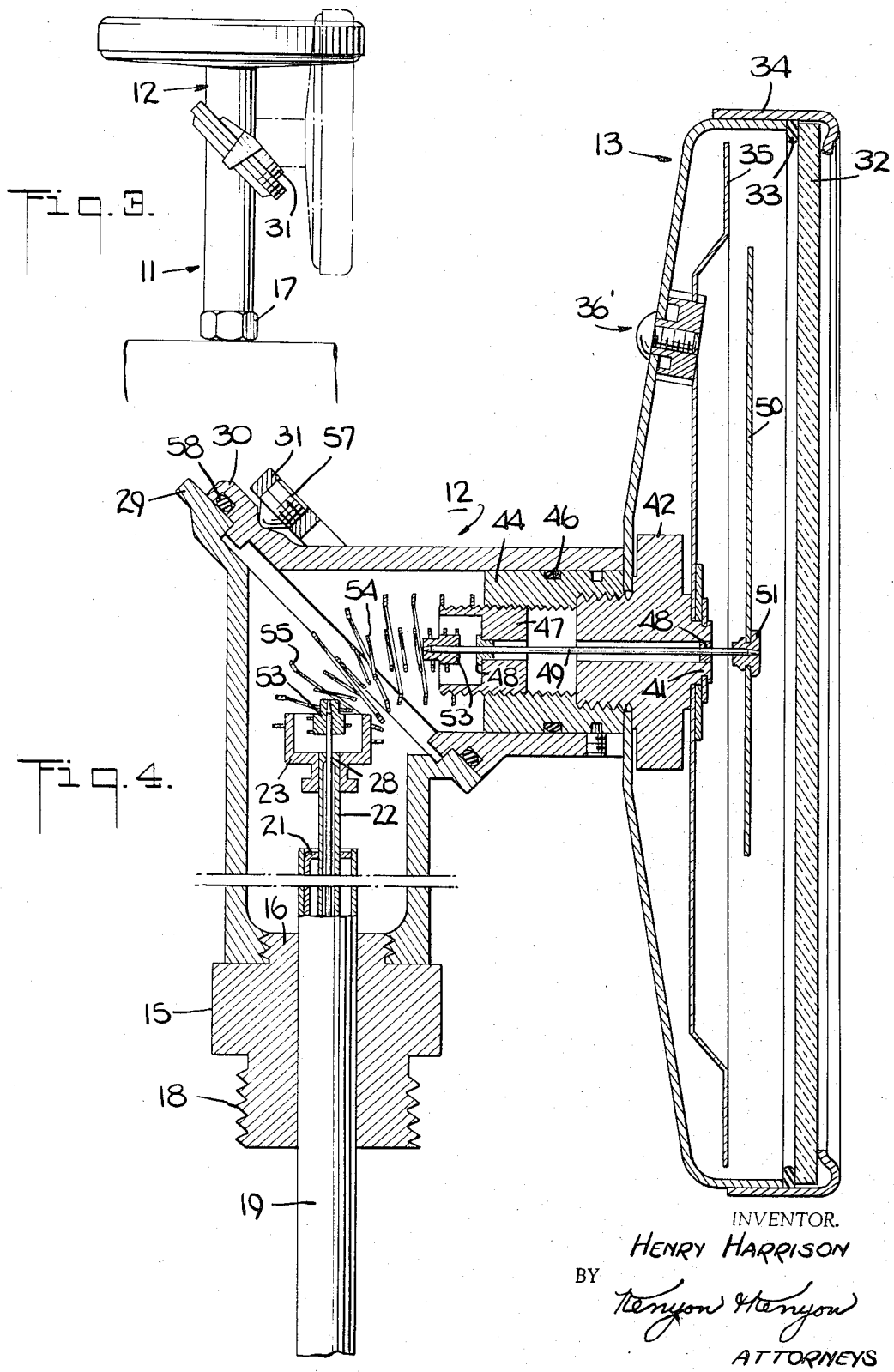

INVENTOR.
HENRY HARRISON
BY
Kenyon & Kenyon
ATTORNEYS

Dec. 12, 1967     H. HARRISON     3,357,251

ADJUSTABLE DIAL THERMOMETER

Filed July 16, 1965     5 Sheets-Sheet 4

$$d = L\left(\frac{2\sin A}{\pi} + \frac{\cos A}{A} - \frac{1}{A}\right)$$

INVENTOR.
HENRY HARRISON
BY
Kenyon & Kenyon
ATTORNEYS

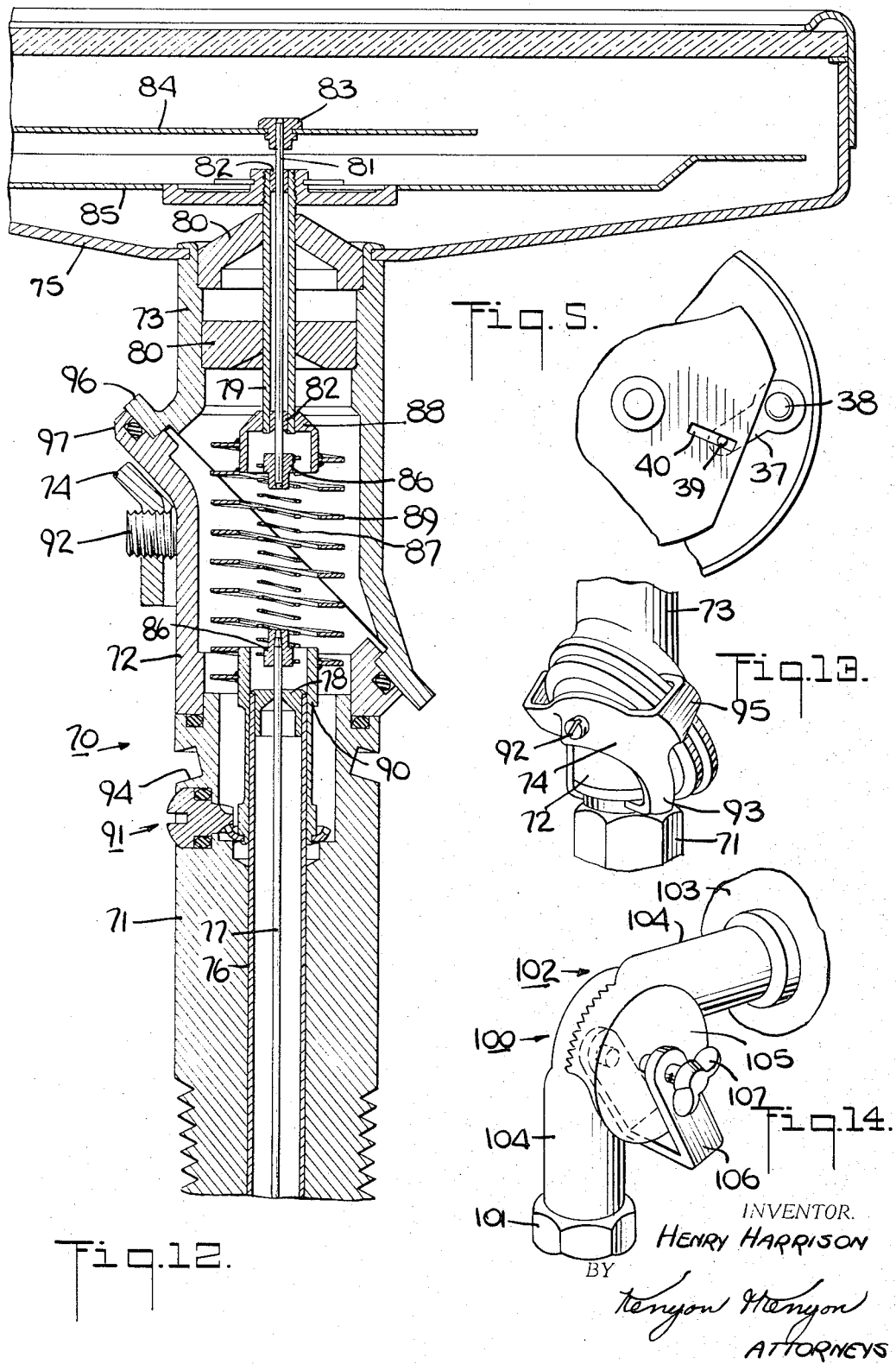

United States Patent Office 3,357,251
Patented Dec. 12, 1967

3,357,251
ADJUSTABLE DIAL THERMOMETER
Henry Harrison, Locust Valley, N.Y., assignor to Moeller Instrument Company, Inc., Richmond Hill, N.Y., a corporation of New York
Filed July 16, 1965, Ser. No. 472,642
28 Claims. (Cl. 73—363.7)

ABSTRACT OF THE DISCLOSURE

The housing portion which is mounted on the stem portion is rotatable and pivotable about the stem portion while the dial portion is rotatable about the axis of the housing portion. The measuring assembly includes the two coupling springs which permit rotation of the pointer against a calibrated dial in response to a temperature change while also maintaining a dial reading during pivoting of the housing portion relative to the stem portion.

---

This invention relates to gauges. More particularly, this invention relates to bimetallic dial type gauges employed for measurement of temperature, and still more particularly to bimetallic dial type temperature gauges which are adjustable.

The conventional bimetallic dial gauge has a head containing a graduated dial and a pointer which is movable relative thereto, and it has a stem containing the means to move the pointer over the scale in response to variations in the condition to be measured, such as variations in temperature. The head and stem are usually secured to one another. However, dial thermometers are likely to be mounted in many different positions to suit the convenience of the particular job on which they are installed. As a result, the manufacturer has had to manufacture a number of different types of dial gauges and thermometers to meet industrial requirements. For instance, if a thermometer had to be placed overhead, the dial gauge had to be built so that the dial tilted downwardly so that it could be read; if the thermometer was to be mounted below the normal line of vision, the dial gauge had to be built so that the dial tilted upwardly, etc.

Efforts have been made in the past to provide bimetallic multiangular gauges but have not proved satisfactory in practice for various reasons. In some cases, the gauges have been inaccurate, the inaccuracy occurring in the calibration between the head and the stem when the head is tilted with reference to the stem. In other cases the gauges have been restricted to angular adjustment in only one plane. Also, some gauges have been subjected to an excessive amount of friction in the indicating mechanism when an adjustment is made between the head and stem while other gauges have been unsuited for repeated adjustment, accidental loads or easy cleaning.

This invention overcomes these and other problems of the prior art by providing an adjustable bimetallic rotary transmission dial thermometer which is capable of adjustment to any desired position in any number of horizontal and vertical planes. In other words, an adjustable dial thermometer wherein the dial is capable of being perpendicular to the line of sight with the scale in an upright position while the stem is at any angle in any plane through the line of sight. The adjustable dial thermometer comprises a stem portion which is adapted for fixed mounting, a dial portion which is adapted for rotation and pivoting with respect to the stem portion, and an intermediate housing portion which is rotatably and slidably mounted between the stem and dial portions and provides a mating oblique surface with one of the stem and dial portions.

The stem portion contains a sensing device therewithin which is responsive to temperature, pressure or the like. The sensing device is coupled by a spring to a pointer shaft which is mounted for rotation within the dial portion and which cooperates with a suitable dial face therein. A second concentric spring is positioned around the coupling spring for the sensing device and further connects the sensing device to the dial portion in a manner which permits the dial portion to rotate with respect to the stem portion or to rotate and move into angular relationship therewith without changing the position of the pointer shaft with respect to the dial face, i.e., the dial reading.

Thus, when the stem portion has been set in place, the dial portion can be so rotated about the stem portion without any changes between the pointer shaft and dial face, i.e., the dial reading. Further, the dial portion can be angularly adjusted with respect to the stem portion without any change in the dial reading. It is noted that the dial portion is adapted to rotate about 180° on its axis as it is angularly adjusted with respect to the stem portion. Further, the axis of the dial portion makes an angle with the axis of the stem portion which can be adjusted to any angle between 0° and some limiting angle characteristic of the specific design.

The stem, housing and dial portions of the thermometer are made so that the interior of the thermometer is completely sealed from the exterior thereof. This is an especially important feature when the thermometer is adapted for use in a corrosive environment.

It is therefore an object of this invention to provide a multi-angle gauge.

It is another object of this invention to provide a multi-angle gauge which is adjustable.

It is another object of this invention to provide a joint in an adjustable multi-angle gauge between a dial portion and a stem portion which maintains the axes of two coupling springs therein at equal length during angular movement between the stem and dial portions.

It is another object of this invention to provide a joint in an adjustable multi-angle gauge between a dial portion and a stem portion which maintains the axes of two coupling springs therein in a circular arc during angular movement between the stem and dial portions.

It is another object of this invention to provide a sealed joint for the spring coupling of an adjustable multi-angle gauge.

It is another object of this invention to provide an accurate temperature sensing instrument having a dial which can be adjusted to a suitable orientation for easy reading without affecting the accuracy of the instrument.

These and other objects of the invention will become apparent hereinafter from the following detailed description and appended claims when taken in conjunction with the accompanying drawings in which:

FIG. 1 illustrates a perspective view of an adjustable dial thermometer of this invention;

FIG. 2 illustrates a cross-sectional view of the thermometer of FIG. 1;

FIG. 3 illustrates a side view of the dial portion of the thermometer of this invention in its two extreme positions;

FIG. 4 illustrates a cross-sectional view of the thermometer of this invention in its extreme angular position;

FIG. 5 illustrates a view taken on line 5—5 of FIG. 2;

FIG. 12 illustrates a modification of a thermometer of this invention;

FIG. 13 illustrates a perspective view of the thermometer illustrated in FIG. 12; and FIG. 14 illustrates a further modification of the thermometer of this invention.

Figure 6:
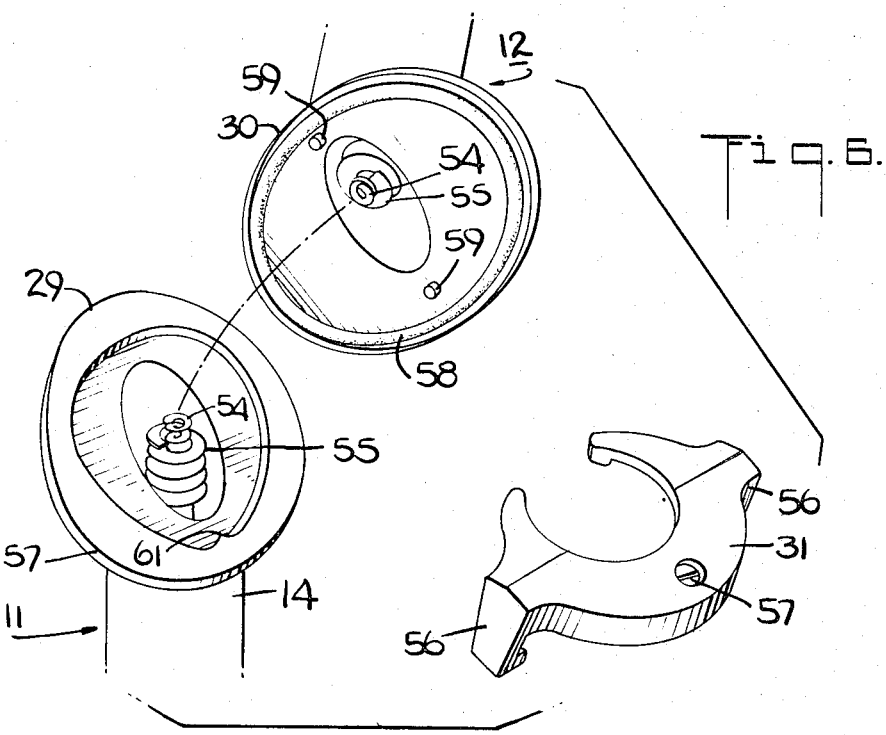
FIG. 6 illustrates a blown-up view of the cam surfaces of the mating stem and dial portions and the joint clamp.

Referring to FIGS. 1, 2 and 5, an adjustable dial thermometer 10 of the invention comprises a stem portion 11 which is adapted to be fixed in a vessel from which a reading is desired, a dial mounting portion 12 rotatably mounted on the stem portion 11, and a dial case 13 rotatably mounted on the dial mounting portion 12. The dial mounting portion 12, like the stem portion 11 and dial case 13, is formed with a continuous exterior surface so that the thermometer forms a completely sealed unit.

The stem portion 11 is constructed of a cylindrical housing 14 and an externally threaded stem base 15. The stem base 15 has a raised portion 16 which is secured in the housing 14, as by threading, and a lower portion which is formed with suitable flats 17 and threads 18 for securing the stem portion 11 in the desired vessel. The stem base 15 fixedly mounts an elongated stem tube 19 therein, as by soldering which extends from the stem base. The exposed end of the stem tube 19 is provided with a cap 20 which is secured thereto, as by welding. The stem tube 19 houses a cartridge bearing 21 therein. The bearing 21 is press-fitted in the stem tube 19 and provides a slidable as well as a rotatable bearing surface for a cartridge tube shaft 22. The tube shaft 22 has an end cup 23 fixedly mounted at an end thereof which projects into the housing 14.

A suitable temperature sensing assembly 24 is suitably mounted on the opposite end of the cartridge tube shaft 22 from the cartridge end cup end. This temperature sensing assembly 24 comprises a helical coil 25 of bimetal strip, laminated from layers of metal having different coefficients of thermal expansion. As is well known, a structure of this kind responds to variations of temperature principally by coiling and uncoiling to produce an angle of twist about its axis between the two ends. It is also well known that as it twists, the coil changes length somewhat from end to end. For this reason, the bimetal coil 25 is fabricated from two bimetal helices of approximately equal size, joined in tandem. One helix is wound in a righthand sense with the low expansion material on the inside while the other helix is wound in a lefthand sense with the low expansion material on the outside. Because one helix uncoils while the other coils, the twist of both is in the same sense, but one expands in length while the other contracts. Thus the bimetal coil 25 produces a pure twist with no net change in length. However, a helical coil wound in one hand may also be used.

The bimetal coil 25 is secured, as by welding, at one end thereof to a suitable sleeve 26 which is press-fitted to the end of the cartridge tube shaft 22. The other end of the bimetal coil 25 is similarly secured to a bimetal shaft 27 which passes through the cartridge tube shaft 22 into the end cup 23. The bimetal shaft 27 is journalled in the tube shaft 22 by a suitable pair of bushings 28 press-fitted to the inside wall of the cartridge tube shaft 22.

The cylindrical housing 14 has a flange 29 which forms an upper surface which is on an oblique angle to the vertical axis of the dial thermometer 10 upon which rests the flange 30 of the dial mounting portion 12 which has a complementary angled lower surface. The flanges 29, 30 are maintained in relatively rotatable engagement by a clamp means 31 which will be more particularly described hereinafter.

The dial case 13 is of a standard type and has a transparent cover 32 sealingly secured thereto by a gasket 33 and escutcheon ring 34. The dial scale 35 is provided with suitable gradations thereon as well as a calibration adjustment mechanism 36. Referring particularly to FIG. 5, the adjustment mechanism 36 comprises a cam lever 37 which is rotatably mounted in the base of the dial case 13 by a suitable rotatable means 38, such as a button head screw and nut. The lever 37 has a fixed pin 39 at one end which projects through a slot 40 in the dial scale 35. Thus, upon rotation of the rotatable means 38, the dial scale 35 is rotated by the pin 39 for a short arcuate distance within the limits of the slot 40.

The dial scale 35 is slidably mounted on a reduced portion 41 of a dial scale mount 42 by means of any suitable means, such as a split ring 43 within a groove in the reduced portion end. The dial scale mount 42 has a portion which passes through the dial case 13 and receives a mounting ring 44 thereon in threaded relationship.

The mounting ring 44 is mounted in the dial mounting portion 12 in rotatable relationship. A suitable means, such as a set screw 45, is provided in the wall of the dial mounting portion 12 to secure the mounting ring 44 against relative rotation when such is desired. Further, a suitable seal, such as an O-ring 46, is provided between the engaging surfaces of the mounting portion 12 and mounting ring 44. The mounting ring 44 has an internally threaded bore which threadably secures a threaded cap 47 therein.

The threaded cap 47 and dial scale mount 42 are each provided with a suitable bearing 48 in their internal bores which serve to rotatably mount a pointer shaft 49. The pointer shaft 49 has a pointer 50 mounted thereon, as by a hub 51, for cooperation with the dial scale 35.

The pointer shaft 49 and bimetal shaft 27 are operably connected to each other by a coupling which includes a pair of hubs 53, each of which is suitably mounted on an opposed end of the shafts, as by a press-fit, and a dial coupling spring 54. Likewise, the threaded cap 47 and end cup 23 are operably connected to each other by a cartridge coupling spring 55 which is suitably secured to each of the cap and cup members. The coupling springs 54, 55 are concentrically mounted with respect to each other and are of the same free length. When the dial thermometer 10 is in an upright position, as in FIG. 2, the respective ends of the coupling springs 54, 55 are coplanar with respect to each other.

Referring to FIGS. 3 and 4, the dial thermometer 10 is illustrated at one of its extreme positions, that is, with the stem portion 11 at a 90° angle with the dial mounting portion 12. The thermometer 10 shown illustrates the use of another type of calibration adjustment mechanism 36'. When the thermometer is brought to the illustrated position, the coupling springs 54, 55 are bent into circular arcs while remaining concentric. Since there is no torsion on the coupling springs during the positioning operations, there is no twist introduced into the springs, only bending. Further, the cartridge tube shaft slidably moves into the stem tube 19 without introducing any compression into the coupling springs. Thus, there will be no change in the relative position of the pointer 50 and dial scale 35. Furthermore, because the coupling springs are bent into circular arcs, the shape of minimum curvature, a minimum amount of bending moment is required. This introduces the smallest possible additional frictional resistance at the pointer shaft bearings 48, the bimetal shaft bearings 28, and the cartridge tube bearings 21.

Figure 7:
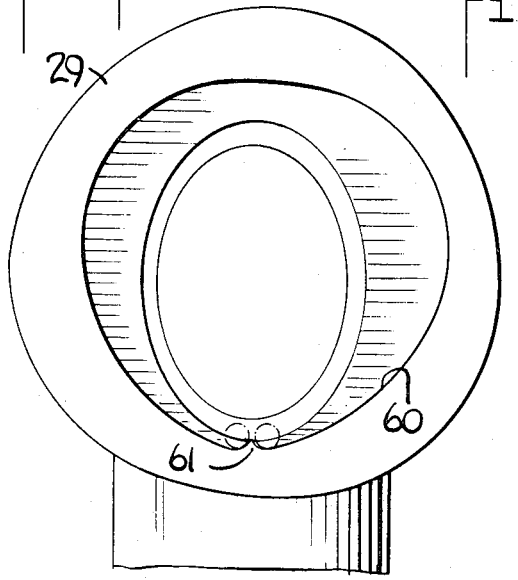
FIG. 7 illustrates a plan view of the mating cam surface on the thermometer stem portion.
Figure 8:
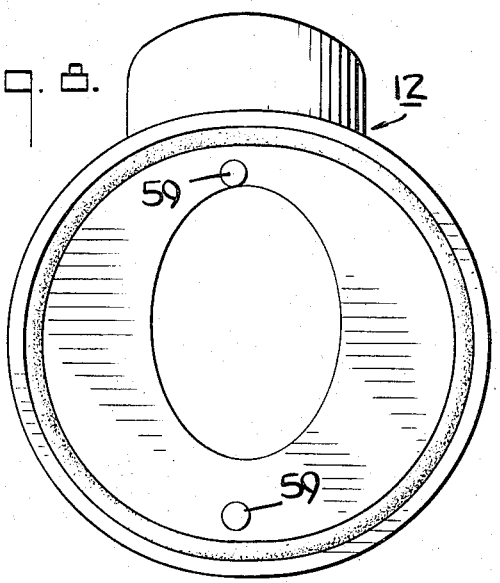
FIG. 8 illustrates a plan view of the mating surface on the thermometer dial portion.

Referring to FIGS. 6, 7 and 8, the flanges 29 and 30 of the housing 14 and dial mounting portion 12 are held in engagement by the clamp means 31. The clamp means 31 is substantially U-shaped and has hook-like portions 56 on either side which clamp against the underside of flange 29. A set screw 57 at the base of the clamp means 31 has a dog point thereon for engagement in a recess 57' (FIG. 1) in the upperside of the flange 30. The set screw 57 cooperates with the extremities of the clamping means 31 and the hook-like portions 56 to clamp the dial mounting portion 12 and housing 14 firmly together after a rotational adjustment has been made. The flange 29 is provided with a cam surface 57 which bears against the hook-like portions 56 during relative rotation between the stem portion 11 and dial mounting portion 12.

The flange 30 is provided with a circular groove therein which houses an O-ring 58 for sealing the joint between the respective flanges 29, 30. Further, flange 30 is provided with a pair of oppositely positioned pins 59 thereon which project into the flange 29.

The flange 29 partially guides the rotation of the mounting portion 12 thereon by means of the pins 59 and a cam surface 60 which guides the pins 59. Cam surfaces 57 and 60 of flange 29 work together to define the relative position of housing portion 12 and stem portion 11 during relative rotation of these two parts. The shape of these cams is shown in FIGS. 6, 7 and 8.

The outer cam surface 57 and the cam surface 60 of the flange 29 are designed to control the relative location of the dial mounting portion 12 on the stem portion 11 in such a way that the axes of the portions 11, 12 remain in the same plane and remain tangent to the ends of a circular arc of constant length, having one end fixed in the portion 12. This condition of restraint introduces a mimimum of shaft friction and no systematic error from compression of the coupling spring helices 54, 55 when the angle between the portions 11, 12 is adjusted.

Figure 9:
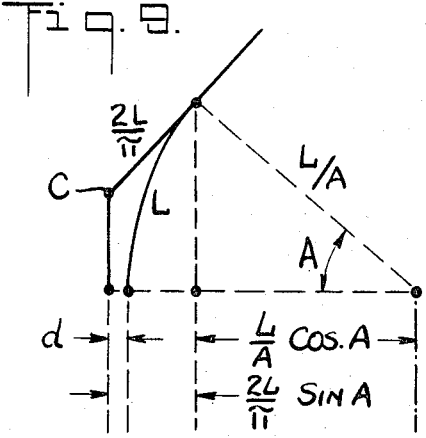
FIGS. 9 to 11 illustrate the geometric relationships of the axes of the stem and dial portions which determine the shape of the cam surface.
Figure 10:
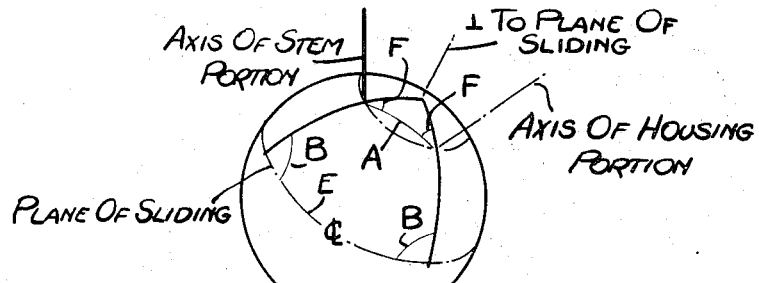
Figure 11:
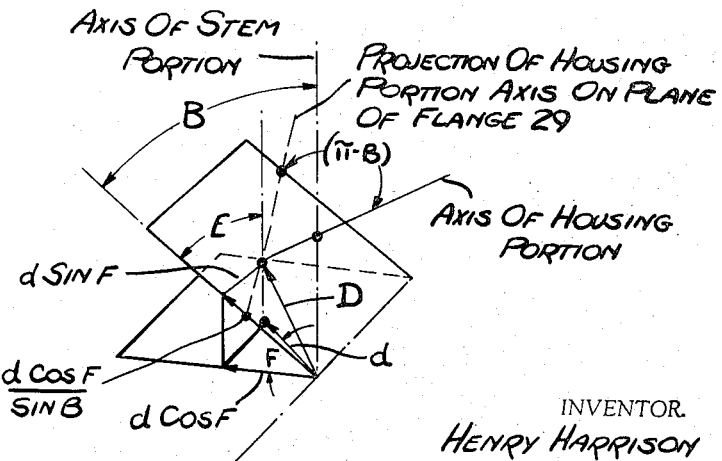

Referring to FIGS. 9 to 11, the circular arc L of angle A (measured in radians) represents the constant length of the coupling springs. The radius of the arc L thus is $L/A$. Further, A is the bend angle between the dial mounting portion 12 and stem portion 11, and $d$ is the displacement of the axis of the stem portion from the point C. The horizontal distance from the lower extremity of the arc to the center, therefore, is $L/A$, and the horizontal distance from the upper extremity of the arc to the center is $L/A \cos A$. For reasons which will be explained, the oblique plane of sliding is taken through the point C, a distance $2L/\pi$ from the upper extremity of the arc. The horizontal distance from point C to the upper extremity of the arc is $(2L/\pi) \sin A$. The distance horizontally from point C to the lower extremity of the arc, which will be called $d$, is $(L)$ $([2/\pi) \sin A + (1/A) \cos A - (1/A)]$. Now it is evident that when A is zero $\sin A$ is zero and $\cos A$ is 1, so that $d$ is zero; and when A is $\pi/2$ radians (90°), $\sin A$ is 1 and $\cos A$ is 0, so that $d$ is again zero. This is the reason for the choice of point C. That is, the choice of point C at $2L/\pi$ from the upper extremity of the arc makes $d$ zero at both 0° and 90°.

FIGURE 10 shows the angular relationships which occur when the portion 12, at an angle B with its oblique flange 29 is swiveled or slid around in contact with the flange 30 of the portion 11, which also makes an angle B with the axis of the portion 11. If the angle through which the flange 29 is rotated with respect to the flange 30 is called E, then the angle A between the axes of the portions 11, 12 is $\cos^{-1} (\sin^2 B - \cos^2 B \cos E)$. Also the angle A is in a plane which makes an angle F with the plane of angle B, such that $F = \sin^{-1} (\sin E/\sin A) \cos B$.

FIGURE 11 shows how the angles derived from FIGURE 10 and the displacement derived from FIGURE 9 are related to compute the cam contours 57, 60 of FIGURE 6. The displacement $d$ is in the plane of the angle A, at an angle F to the plane of the angle B. The projection of $d$ on a horizontal line in the plane of the angle B is therefore $d \cos F$, and the perpendicular component in a horizontal plane $d \sin F$. In the oblique plane of sliding, the came plane, the component in the plane of angle B is $d \cos F/\sin B$, and the perpendicular component is again $d \sin F$. These components of displacement correspond to the angle E in the plane of sliding of the portion 12 with respect to the portion 11. Once the components of displacement are tabulated as a function of E, the contours of the cam can be laid out graphically by well known methods, or they can be computed by analytic geometry.

It is desirable to have a limit stop to limit the swiveling of the dial mounting portion 12 with respect to the stem portion 11 to 180°. The inwardly extending cusp 61 in the internal cam contour stops against the pins 59 to provide this limit stop. The center line of these pins is displaced from the axis of the portion 12 to permit a full 180° motion.

In the process of mounting and adjusting the instrument, the stem tube 19 is inserted into the vessel or opening where it is desired to measure the temperature. The threads 18 are screwed into engagement with complementary threads in the vessel or opening, for example, as by means of a suitable wrench on the flats 17. The set screw 57 in the clamp means 31 is then loosened and the dial mounting portion 12 is swiveled around to a suitable bend angle. Then the set screw 57 is tightened to maintain the bend angle and the set screw 45 in the dial mounting portion 12 is loosened. The dial case 13 is then rotated to align the pointer 50 and the scale 35 into an easily readable position. The set screw 45 is then tightened and the dial thermometer is in position. In case any recalibration is needed, the screw 38 can be rotated to provide the necessary alignment of pointer and scale.

Referring to FIGS. 12 and 13, the thermometer may be modified in a manner wherein the bimetal shaft is in longitudinally fixed relation with respect to the stem portion and the dial scale and pointer move longitudinally of the dial mounting portion. The thermometer 70 comprises a stem portion 71, a housing portion 72 having an upper oblique surface rotatably mounted on the stem portion 71, a complementary surfaced dial mounting portion 73 rotatably mounted on and secured by a clamp 74 to the housing portion 72, and a dial case 75 fixedly secured to the dial mounting portion 73.

The stem portion 71 fixedly secures an elongated stem tube 76 therein which houses a temperature sensing device (not shown). The temperature sensing device is operably connected to and drives a transfer shaft 77 which is rotatably mounted in suitable bearings 78 in the stem tube 76.

The dial mounting portion 73 is fixed to the dial case 75, as by peening over the edges of the portion 73. The dial mounting portion 73 rotatably and slidably mounts a cartridge shaft 79 in a pair of suitable bearings 80. The cartridge shaft 79 in turn rotatably and slidably mounts a pointer shaft 81 on suitable bearings 82. One end of the pointer shaft 81 secures a hub 83 and pointer 84 thereon in a suitable manner. A dial scale 85 is mounted in fixed relation to one end of the cartridge shaft 79 and cooperates with the pointer 84 to give a responsive reading.

The pointer shaft 81 and transfer shaft 77 are operably connected by a pair of suitable hubs 86 fixed to each shaft and a dial coupling spring 87. The cartridge shaft 79 fixedly mounts an end cup 88 thereon which is connected by a cartridge coupling spring 89 to a rotatable sleeve 90 on the stem tube 76.

A recalibration device 91 is mounted in the stem portion 71 to cooperate with the rotatable sleeve 90 on the stem tube 76 for slight dial scale adjustment. The sleeve 90 has a close fit on the stem tube 76 which maintains a fixed relationship but which can be overcome by actuation of the recalibration device 91. The recalibration device 91 can be of any suitable construction.

The clamp 74 has two pairs of lugs which cooperate with a screw 92, for example, a headless set screw enlarged at the bearing end to prevent removal, to secure the relative positions of the dial mounting portion 73 and stem portion 71. The pair of lugs 93 have hook-like portions which project into a suitably formed groove 94 in the stem portion 71 and the other pair of lugs 95 have hook-like portions which overlap the flanges 96, 97 formed respectively on the dial mounting portion 73 and housing portion 72.

The flanges 96, 97 of the portions 73, 72 are formed with pins and cam surfaces similar to the pins and cam surfaces described in the embodiment illustrated in FIGS. 1 to 11. However, the cam surfaces can be omitted. This adds some friction to the pointer movement, but the accuracy of the thermometer is not otherwise impaired, for applications where a precise reading with close tolerances is not required.

In use, the stem portion 71 is threaded into the vessel to be tested. The screw 92 is loosened and the dial mounting portion is swiveled around to a desired bend angle. Also, the housing portion 72 is rotated on the stem portion 71 to bring the dial case 75 into a desired reading plane. The screw 94 is then tightened to maintain the positions. If a recalibration is needed, the recalibration device 91 is actuated to rotate the scale 85 the necessary amount relative to the pointer 84.

Referring finally to FIG. 14, the concentric coupling springs and relatively slidable cartridge members can be incorporated into an indicating device which is pivotable in only one plane. As shown, the stem portion 101 of the thermometer 100 is connected by a joint 102 to a dial case portion 103. The joint comprises a pair of shafts 104 having enlarged circular portions 105 in mating engagement and secured together by a U-shaped clamp 106. The clamp 106 has a means 107 thereon for securing the clamp to the portions 105.

In this structure, the axis of the pivot is offset from the axis of the coupling springs, when in their unbent position, in the direction of the bending.

It will be evident from the foregoing descriptions that a new and useful instrument has been devised, the dial of which can be oriented and turned for convenient reading without introducing calibration errors, but which can be recalibrated after adjustment if necessary. The novel mechanisms employed, however, are suited to other kinds of instruments, and could be adapted to them by persons skilled in the art. Examples would be bourdon spiral pressure gauges, mechanical torsional strain gauges, humidity gauges, and in fact any kind of instrument where the twist of a shaft in an inaccessible location is to be read on a dial and the dial must be oriented after mounting for easy reading. Further, a number of modifications can be made without departing from the scope of the invention. For example, a wedge shaped member can be incorporated in the housing between the dial portion and stem portion to affect a relative angular change therebetween. Accordingly, it is intended that all matter contained in the foregoing description or shown in the accompanying drawings shall be interpreted as illustrative and not in a limiting sense.

What is claimed is:

1. An apparatus comprising a housing having jointed elongated portions, each of said portions having a longitudinal axis, one of said portions being rotatable about its longitudinal axis with respect to another of said portions; a drive means; a first means connected to one end of said drive means and having a first axis parallel to the longitudinal axis of said one of said housing portions supported by said housing; a driven rotatable means connected to the other end of said drive means; a second means having a second axis supported by a different portion of said housing in parallel relation to the longitudinal axis of said different housing portion; a second rotatable means movable with respect to said second means; first bendable torsion coupling means joining said first means with said second means, and second bendable torsion coupling means joining said driven rotatable means to said second rotatable means; said jointed housing adapted to adjust the direction of the axis of said second means and to set the angular position of said second means around its axis without changing the position of said second rotatable means with respect to said second means.

2. An apparatus comprising a housing having jointed portions movable with respect to each other, each of said portions having a continuous exterior surface, said surfaces of said portions jointly forming a sealed housing; a drive means, mounted in one of said housing portions; a first rotatable means mounted in another of said housing portions; a driven means mounted in said first rotatable means; first means for operably connecting said drive means and said driven means; second means for operably connecting said first rotatable means to said drive means; means between said housing portions for permitting angular variation between the axis of said one of said housing portions and the axis of said another of said housing portions without varying the relative angular portion of said driven means and said first rotatable means.

3. An apparatus comprising a stem portion having a longitudinal axis passing therethrough; a dial portion rotatably mounted on said stem portion about the longitudinal axis thereof; a rotatable means rotatably mounted on said dial portion; a pointer means rotatably mounted in said rotatable means; means for angularly adjusting the axis of said dial portion with respect to the axis of said stem portion; a drive means in said stem portion connected at one end thereof to said pointer means and connected at the other end thereof to said rotatable means, first bendable torsion coupling means connecting said one end of said drive means to said pointer means, and second bendable torsion coupling means connecting said other end of said drive means to said rotatable means, said angularly adjusting means adapted to set the angular position of said rotatable means around the axis thereof without changing the position of said pointer means with respect to said rotatable means while said stem portion is held stationary.

4. An apparatus comprising a housing having jointed elongated portions, each of said portions having a longitudinal axis, one of said portions being rotatable about its longitudinal axis with respect to another of said portions; a first rotatable means mounted in one of said housing portions for rotation about the longitudinal axis of said another portion; a drive means connected at one end of said first rotatable means; a second rotatable means mounted in said first rotatable means; said second rotatable means connected to the other end of said drive means; a third rotatable means mounted in another of said housing portions; a driven means mounted in said third rotatable means; first bendable torsion coupling means operably connecting said second rotatable means and said driven means; second bendable torsion coupling means operably connecting said first rotatable means and said third rotatable means; and means in said housing between said jointed portions for permitting angular variations between the axis of said one of said housing portions and the axis of said another of said housing portions without varying the relative angular position of said driven means and said third rotatable means.

5. An apparatus comprising a support means; a first rotatable means mounted on said supporting means on an oblique plane thereto; a second rotatable means mounted on said first rotatable means; a driven means rotatably secured in said second rotatable means; a drive means located in said support means; a third rotatable means connected to one end of said drive means, said third rotatable means being rotatably and slidably mounted in said support means; a fourth rotatable means connected to another end of said drive means, said fourth rotatable means being rotatably and slidably mounted in said third rotatable means; first means for operably coupling said second rotatable means and said third rotatable means; second means for operably coupling said driven means and said fourth rotatable means; and means provided between said support means and said first rotatable means for maintaining the axes of said first and second coupling means in circular arcs while the axis of said first rotatable means varies angularly with the axis of said support means.

6. An apparatus comprising a support means; a first rotatable means mounted on said support means on an oblique plane thereto; a second rotatable means mounted on said first rotatable means; a driven means rotatably secured in said second rotatable means; a drive means located in said support means; a third rotatable means connected to one end of said drive means, said third rotatable means being rotatably and slidably mounted in said support means; a fourth rotatable means connected to another end of said drive means, said fourth rotatable means being rotatably and slidably mounted in said third rotatable means; first means for operably coupling said second rotatable means and said third rotatable means; second means for operably coupling said driven means and said fourth rotatable means; and cam means provided between said support means and said first rotatable means for guiding said first rotatable means in a predetermined path in said oblique plane whereby minimum torsional friction is introduced in said third rotatable means and whereby the relative angular position between said driven means and said second rotatable means remains constant.

7. An apparatus as set forth in claim 6 wherein said drive means comprises a temperature-sensing means.

8. An apparatus as set forth in claim 7 wherein said temperature-sensing means comprises a pair of bimetal helices connected in tandem, one of said pair of helices being wound in an opposite hand from the other of said pair of helices, said one of said pair of helices having strips of material of different coefficients of expansion in reverse order from the strips of material of said other of said pair of helices.

9. An apparatus as set forth in claim 6 wherein said driven means comprises a pointer shaft having a pointer mounted thereon.

10. An apparatus as set forth in claim 6 wherein said cam means comprises a U-shaped clamping lug having a pair of hook-like portions thereon for engaging a collared portion on said support means, said clamping lug being positioned on a collar on said first rotatable means.

11. An apparatus as set forth in claim 6 wherein said cam means further comprises a pair of pins in said first rotatable member and a cam surface in said support member for guiding said pins, said cam surface defining the locus of a predetermined point on the tangent to an end of the axis of said coupling means when in an arcuate configuration.

12. A gauge comprising a support member; a first rotatable means mounted on said support member in an oblique plane thereto; a dial case means rotatably supported on said first rotatable means; a drive means located in said support member; a second rotatable means connected to one end of said drive means, said second rotatable means being rotatably and slidably mounted in said support means; first bendable torsion spring means coupling said second rotatable means to said dial case means; a third rotatable means connected to another end of said drive means, said third rotatable means being slidably and rotatably received in said second rotatable means; a pointer means connected to said third rotatable means, said pointer means being rotatably received in said dial case means; second bendable torsion spring means coupling said pointer means to said third rotatable means, said second spring means being concentric to said first spring means and of equal axial length thereto; and means for guiding said first rotatable means on said support member during rotation of said first rotatable means about an axis which varies angularly with respect to the axis of said support member whereby said first and second spring means maintain equal axial lengths.

13. A gauge as set forth in claim 12 which further comprises a graded dial scale in said dial case means for cooperation with said pointer means and a recalibration means for turning said dial scale relative to said pointer means.

14. A gauge as set forth in claim 13 wherein said recalibration means comprises a screw means mounted in the base of said dial case and exposed exteriorly thereof.

15. A gauge as set forth in claim 13 wherein said drive means comprises a temperature-sensing device.

16. A gauge as set forth in claim 15 wherein said temperature-sensing means comprises a pair of bimetal helices connected in tandem, one of said pair of helices being wound in an opposite hand from the other of said pair of helices, said one of said pair of helices having strips of material of different coefficients of expansion in reverse order from the strips of material of said other of said pair of helices.

17. A gauge comprising an externally threaded support member; a first rotatable means mounted on said support member in an oblique plane thereto; a dial case means rotatably supported on said first rotatable means; a drive means located in said support member; a second rotatable means connected to one end of said drive means, said second rotatable means being rotatably and slidably mounted in said support means; first spring means coupling said second rotatable means to said dial case means; a third rotatable means connected to another end of said drive means, said third rotatable means being slidably and rotatably received in said second rotatable means; a pointer means connected to said third rotatable means, said pointer means being received in said dial case means; a coil spring means coupling said pointer means to said third rotatable means, said coil spring being concentric to said first spring means; said support means and said first rotatable means each having a collar means thereon in sealing contact with each other; a lug means positioned on said collar means of said first rotatable means and having hook-like portions engaging the side surfaces and underside of said collar means of said support means; and cam means located between said support means and said first rotatable means for maintaining said first spring means and said coil spring means in circular arcuate shape during rotation of said first rotatable means around an axis which varies angularly with respect to the axis of said support member.

18. A gauge as set forth in claim 17 wherein said first rotatable means is rotated approximately 180 degrees in said oblique plane while said axis of said first rotatable means is oriented into an angle with said axis of said support member.

19. In combination with a gauge having a dial portion rotatably mounted on a stem portion for rotation in an oblique plane, said dial portion having a dial scale and a relatively rotatable pointer means therein and said stem portion having a drive means therein, a coupling means for connecting said pointer means to said drive means, and means for guiding said dial portion on said stem portion during relative rotation therebetween whereby said pointer means remains in fixed relation to said scale means and the length of the axis of said coupling means remains constant.

20. The combination as set forth in claim 19 wherein said coupling means comprises a first rotatable means mounted in said stem portion, and secured to one end of said drive means, and a first spring means connecting said first rotatable means and said pointer means.

21. The combination as set forth in claim 20 which further comprises a second rotatable means mounted in said stem portion and secured to the other end of said drive means, and a second spring means connecting said rotatable means and said dial portion.

22. The combination as set forth in claim 21 wherein said drive means comprises a temperature-sensing device.

23. An apparatus comprising a support means; a first rotatable means mounted on said support means; a second rotatable means mounted on said first rotatable means on an oblique plane thereto; a drive means secured in said support means; a third rotatable means slidably and rotatably mounted in said second rotatable means; a driven means rotatably and slidably mounted in said third rotatable means; a first means for operably coupling said drive means and said driven means; a second means for operably coupling said support means and said third rotatable means, said first and second coupling means being of equal axial length; and means provided between said first rotatable means and said second rotatable means for maintaining the axes of said first and second coupling means in circular arcs of equal length while the axis of said second rotatable means varies angularly with the axis of said first rotatable means.

24. A gauge for maintaining a pointer in constant relative position with respect to a dial case during rotation of the dial case comprising a support member; a first rotatable means mounted on said support means; a dial case means mounted on said first rotatable means in an oblique plane thereto; a drive means secured in said support means; a second rotatable means slidably and rotatably mounted in said dial case means; a pointer means rotatably and slidably mounted in said second rotatable means; a first bendable torsion means for operably coupling said drive means and said pointer means; a second bendable torsion means for operably coupling said support means and said second rotatable means, said first and second torsion means being of equal axial length; and cam means provided between said first rotatable means and said dial case means for maintaining the axes of said first and second coupling means in circular arcs of equal length while the axis of said dial case means varies angularly with the axis of said support means.

25. A gauge as set forth in claim 24 which further comprises a graded dial scale in said dial case means for cooperation with said pointer means and a recalibration means for turning said dial scale relative to said pointer means.

26. A gauge as set forth in claim 24 wherein said drive means comprises a temperature-sensing device.

27. An apparatus as set forth in claim 2 wherein each of said portions has an enlarged circular portion in mating engagement with the circular portion of the other portion, and said means between said housing portions includes a U-shaped clamp about said circular portions and a means securing said clamp to said circular portions.

28. An apparatus as set forth in claim 4 wherein said first and second coupling means are springs and permit rotation of said second rotatable means relative to said housing with one of said jointed portions held at an angle of approximately 90° with respect to another of said jointed portions.

References Cited

UNITED STATES PATENTS 2,925,734    2/1960    Gorgens _____ 73—418 XR

DAVID SCHONBERG, *Primary Examiner.*

LOUIS PRINCE, *Examiner.*

W. HENRY, *Assistant Examiner.*

UNITED STATES PATENT OFFICE
CERTIFICATE OF CORRECTION

Patent No. 3,357,251

December 12, 1967

Henry Harrison

It is hereby certified that error appears in the above numbered patent requiring correction and that the said Letters Patent should read as corrected below.

Column 5, line 44, for "(1/A)]" read -- (1/A]) --; line 69, for "came plane" read -- cam plane --; column 8, line 16, for "angular portion" read -- angular position --; line 43, for "another" read -- one --; line 48, after "portions" insert -- for rotation about the longitudinal axis of said another portion --; line 60, for "supporting" read -- support --.

Signed and sealed this 21st day of January 1969.

(SEAL)
Attest:

Edward M. Fletcher, Jr.
Attesting Officer

EDWARD J. BRENNER
Commissioner of Patents